United States Patent
Yun et al.

(10) Patent No.: US 11,695,151 B2
(45) Date of Patent: Jul. 4, 2023

(54) CASE FOR LITHIUM METAL SECONDARY BATTERY, LITHIUM METAL SECONDARY BATTERY COMPRISING SAME, METHOD FOR MANUFACTURING SAME

(71) Applicant: LG CHEM, LTD., Seoul (KR)

(72) Inventors: Hyun-Woong Yun, Daejeon (KR); Jong-Keon Yoon, Daejeon (KR); Hyun-Jun Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 546 days.

(21) Appl. No.: 16/650,102

(22) PCT Filed: May 7, 2019

(86) PCT No.: PCT/KR2019/005432
§ 371 (c)(1),
(2) Date: Mar. 24, 2020

(87) PCT Pub. No.: WO2019/216622
PCT Pub. Date: Nov. 14, 2019

(65) Prior Publication Data
US 2020/0227694 A1 Jul. 16, 2020

(30) Foreign Application Priority Data
May 8, 2018 (KR) .......... 10-2018-0052652

(51) Int. Cl.
*H01M 10/0525* (2010.01)
*H01M 50/121* (2021.01)
(Continued)

(52) U.S. Cl.
CPC ..... *H01M 10/0525* (2013.01); *H01M 50/121* (2021.01); *H01M 50/124* (2021.01); *H01M 50/119* (2021.01)

(58) Field of Classification Search
CPC .......... H01M 50/172; H01M 10/0525; H01M 50/116; H01M 50/543; H01M 50/121;
(Continued)

(56) References Cited

U.S. PATENT DOCUMENTS

| 2012/0114990 A1 | 5/2012 | Jeong et al. |
| 2016/0276632 A1 | 9/2016 | Park et al. |

(Continued)

FOREIGN PATENT DOCUMENTS

| CN | 103168377 A | 6/2013 |
| CN | 104769744 A | 7/2015 |

(Continued)

OTHER PUBLICATIONS

International Search Report (with partial translation) and Written Opinion issued in corresponding International Patent Application No. PCT/KR2019/005432, dated Aug. 27, 2019.
(Continued)

*Primary Examiner* — Gary D Harris
(74) *Attorney, Agent, or Firm* — Morgan, Lewis & Bockius LLP (57) ABSTRACT

Provided is a casing for a lithium metal secondary battery including: a battery casing material; at least one releasable capsule attached at least partially or totally to the inner surface of the casing material to cover the inner surface of the casing material; and a release solution supported in the releasable capsule, wherein the releasable capsule includes a capsule coating film and a capsule inner space surrounded with the capsule coating film, the release solution is supported in the capsule inner space, and the release solution includes a release agent and a solvent. A lithium metal secondary battery including the casing and a method for manufacturing the same are also provided. It is possible to increase releasability of the negative electrode in a lithium metal secondary battery and to improve nail safety by using the releasable capsule according to the present disclosure.

18 Claims, 3 Drawing Sheets

(51) Int. Cl.
*H01M 50/124* (2021.01)
*H01M 50/119* (2021.01)

(58) Field of Classification Search
CPC .......... H01M 50/124; H01M 10/4285; H01M 50/119; H01M 2200/00; H01M 4/382; H01M 10/052; H01M 50/1243; H01M 50/105; H01M 50/14; Y02E 60/10; Y02P 70/50
USPC ........................................................ 429/179
See application file for complete search history.

(56) References Cited

U.S. PATENT DOCUMENTS

2017/0352844 A1  12/2017  Yu et al.
2018/0123093 A1* 5/2018  Yoshino ................ H01M 10/00

FOREIGN PATENT DOCUMENTS

| | | |
|---|---|---|
| CN | 206194885 U | 5/2017 |
| JP | 2010-073595 A | 4/2010 |
| JP | 2010-235494 A | 10/2010 |
| JP | 2015-222653 A | 12/2015 |
| KR | 10-2012-0085371 A | 8/2012 |
| KR | 10-2012-0111686 A | 10/2012 |
| KR | 10-2015-0134086 A | 12/2015 |
| KR | 10-2016-0059991 A | 5/2016 |
| KR | 10-2016-0108987 A | 9/2016 |
| KR | 10-2017-0126404 A | 11/2017 |
| KR | 10-2018-0005810 A | 1/2018 |
| KR | 10-2018-0029719 A | 3/2018 |

OTHER PUBLICATIONS

Extended European Search Report dated Jan. 13, 2021 issued by the European Patent Office in a corresponding European patent application No. 19799540.0.

* cited by examiner

CASE FOR LITHIUM METAL SECONDARY BATTERY, LITHIUM METAL SECONDARY BATTERY COMPRISING SAME, METHOD FOR MANUFACTURING SAME

TECHNICAL FIELD

The present disclosure relates to a casing for a lithium metal secondary battery, a lithium metal secondary battery including the same, and a method for manufacturing the same.

The present application claims priority to Korean Patent Application No. 10-2018-0052652 filed on May 8, 2018 in the Republic of Korea, the disclosures of which including the specification and drawings are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

As a negative electrode active material for such a lithium secondary battery, lithium metal, a carbonaceous material, silicon, or the like have been used. Particularly, a battery using lithium metal as a negative electrode active material is called a lithium metal secondary battery. Such a lithium metal secondary battery is advantageous in that the highest energy density can be obtained. Thus, continuous studies have been conducted about lithium metal secondary batteries.

However, lithium metal used as a negative electrode active material for a lithium metal secondary battery has soft ductility and low releasability. Therefore, when a penetration member inserted from the outside penetrates through a battery during the use thereof (i.e. when carrying out a nail safety test), ignition may occur or a short-circuit may be generated. Thus, a lithium metal secondary battery is problematic in that it shows poor nail safety as compared to a lithium ion battery generally including graphite used as a negative electrode active material.

DISCLOSURE

Technical Problem

The present disclosure is designed to solve the problems of the related art, and therefore the present disclosure is directed to providing a casing for a lithium metal secondary battery which has excellent nail safety, a lithium metal secondary battery including the same, and a method for manufacturing the same.

The present disclosure is also directed to providing a lithium metal secondary battery which has improved releasability to a penetrating member inserted from the outside.

In addition, the present disclosure is directed to providing a lithium metal secondary battery prevented from a short-circuit.

It will be easily understood that the objects and advantages of the present disclosure may be realized by the means shown in the appended claims and combinations thereof.

Technical Solution

In one aspect of the present disclosure, there is provided a casing for a lithium metal secondary battery capable of solving the above-mentioned technical problems.

According to the first embodiment of the present disclosure, there is provided a casing for a lithium metal secondary battery including: a battery casing material; at least one releasable capsule attached at least partially or totally to the inner surface of the casing material to cover the inner surface of the casing material; and a release solution supported in the releasable capsule, wherein the releasable capsule includes a capsule coating film and a capsule inner space surrounded with the capsule coating film, the release solution is supported in the capsule inner space, and the release solution includes a release agent and a solvent.

According to the second embodiment of the present disclosure, there is provided the casing for a lithium metal secondary battery as defined in the first embodiment, wherein the release agent includes a vinyl acetate resin, vinyl chloride resin, urethane resin, chlorinated rubber resin, phthalic acid resin, alkyd resin, epoxy resin, phenolic resin, melanin resin, acrylic resin, fluoro-resin, silicone resin, metal acrylate resin, a rosin resin, or a mixture of two or more of them.

According to the third embodiment of the present disclosure, there is provided the casing for a lithium metal secondary battery as defined in the second embodiment, wherein the fluoro-resin includes flurorosilane, perfluoropolyether, fluoroacrylate, perfluoromethacrylate, or a mixture of two or more of them.

According to the fourth embodiment of the present disclosure, there is provided the casing for a lithium metal secondary battery as defined in any one of the first to the third embodiments, wherein the releasable capsule includes a polymer resin as a capsule coating film ingredient, and the capsule coating film is ruptured by a penetration member inserted from the outside so that the release solution supported in the capsule inner space is discharged.

According to the fifth embodiment of the present disclosure, there is provided the casing for a lithium metal secondary battery as defined in the fourth embodiment, wherein the polymer resin includes polyolefin, polyethylene terephthalate, polybutylene terephthalate, polyacetal, polyamide, polycarbonate, polyimide, polyetheretherketone, polyethersulfone, polyphenylene oxide, polyphenylene sulfide, polyethylene naphthalene, or a mixture of two or more of them.

According to the sixth embodiment of the present disclosure, there is provided the casing for a lithium metal secondary battery as defined in any one of the first to the fifth embodiments, wherein the release agent is used in an amount of 0.1-80 wt % based on the total weight of the release solution.

According to the seventh embodiment of the present disclosure, there is provided the casing for a lithium metal secondary battery as defined in any one of the first to the sixth embodiments, wherein the releasable capsule has any one shape selected from a foam type, matrix type and a pouch type.

In another aspect of the present disclosure, there is also provided a lithium metal secondary battery capable of solving the above-mentioned technical problems.

According to the eighth embodiment of the present disclosure, there is provided a lithium metal secondary battery including: a battery casing; and an electrode assembly received in the battery casing, wherein the electrode assembly includes a negative electrode, a positive electrode and a separator interposed between the negative electrode and the positive electrode, the negative electrode includes lithium metal as a negative electrode active material, and the battery casing is defined in any one of the first to the seventh embodiments.

In still another aspect of the present disclosure, there is provided a method for manufacturing a lithium metal secondary battery capable of solving the above-mentioned technical problems.

According to the ninth embodiment, there is provided a method for manufacturing a lithium metal secondary battery, including the steps of:

(S1) preparing a release solution including a release agent dispersed in a solvent; (S2) preparing a releasable capsule in which the release solution is supported;

(S3) attaching at least one releasable capsule at least partially or totally to the inner surface of a battery casing material to provide a battery casing in which the inner surface of the battery casing material is covered with the releasable capsule; and (S4) introducing an electrode assembly including lithium metal as a negative electrode active material to the battery casing.

According to the tenth embodiment, there is provided the method for manufacturing a lithium metal secondary battery as defined in the ninth embodiment, wherein the release agent includes a vinyl acetate resin, vinyl chloride resin, urethane resin, chlorinated rubber resin, phthalic acid resin, alkyd resin, epoxy resin, phenolic resin, melanin resin, acrylic resin, fluoro-resin, silicone resin, metal acrylate resin, a rosin resin, or a mixture of two or more of them.

According to the eleventh embodiment of the present disclosure, there is provided method for manufacturing a lithium metal secondary battery as defined in the tenth embodiment, wherein the fluoro-resin includes flurorosilane, perfluoropolyether, fluoroacrylate, perfluoromethacrylate, or a mixture of two or more of them.

According to the twelfth embodiment of the present disclosure, there is provided method for manufacturing a lithium metal secondary battery as defined in any one of the ninth to the eleventh embodiments, wherein the solvent includes perfluropentane, perfluorohexane, perfluoroheptane, perfluorooctane, perfluoromethylcyclohexane, perfluorotripropylamine, perfluorotributylamine, perfluorotriamylamine, perfluorotripentylamine, perfluorotrihexylamine, perfluoro-N-methyl-morpholine, perfluoro-N-ethylmorpholine, perfluoro-N-isoproylmorpholine, perfluoro-N-methylpyrrolidine, perfluoro-1,2-bis(trifluoromethyl)hexafluorocyclobutane, perfluoro-2-butyltetrahydrofuran, perfluorotrimethylamine, perfluorodibutylether, or a mixture of two or more of them.

According to the thirteenth embodiment of the present disclosure, there is provided method for manufacturing a lithium metal secondary battery as defined in any one of the ninth to the twelfth embodiments, wherein the release agent is used in an amount of 0.1-80 wt % based on the total weight of the release solution.

Advantageous Effects

The casing for a lithium metal secondary battery according to the present disclosure includes a releasable capsule on the inner surface of a casing material, and thus the lithium metal negative electrode can have improved releasability to a penetration member inserted from the outside, when the penetration member penetrates through the inner part of the electrode assembly.

In addition, since the releasability of lithium metal to the penetration member is increased by virtue of the releasable capsule, it is possible to provide a lithium metal secondary battery having improved performance in a nail safety test.

In addition, since the release agent is contained in the releasable capsule, it is possible to provide a lithium metal secondary battery having high thermal stability.

Since the casing for a lithium metal secondary battery according to the present disclosure includes the releasable capsule, it is possible to prevent a short-circuit of the lithium metal secondary battery.

Since the lithium metal secondary battery according to the present disclosure uses lithium metal as a negative electrode material, it is possible to provide high energy density. Furthermore, loss of lithium metal caused by adhesion to a nail is decreased during a nail safety test, and thus it is possible to provide higher energy density as compared to the conventional lithium metal secondary battery.

Since the lithium metal secondary battery according to the present disclosure includes the releasable capsule on the inner surface of the casing material, it is possible to provide a lithium metal secondary battery in which the releasable capsule does not affect the cell performance.

BEST MODE

Hereinafter, preferred embodiments of the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Hereinafter, the present disclosure will be explained in detail.

The present disclosure relates to a casing for a lithium metal secondary battery, a lithium metal secondary battery including the same, and a method for manufacturing the same.

A battery using lithium metal as a negative electrode is called a lithium metal secondary battery. Such a lithium metal secondary battery is advantageous in that it can provide high energy density. However, the lithium metal secondary battery is problematic in that it shows lower nail safety as compared to graphite used conventionally as a negative electrode active material. This is because lithium metal has soft ductility, and thus has low releasability to a penetration member penetrating through the inner part of an electrode assembly. Particularly, lithium metal is inserted into a negative electrode active material layer and/or electrode assembly, while being attached to the surface of a nail penetrating through the inner part of the electrode assembly, during a nail safety test. The inserted lithium metal may be in contact with a positive electrode. Since lithium metal has high conductivity, a short-circuit may be generated due to the direct contact between lithium metal and the positive electrode, leading to ignition.

To solve the above-mentioned problem, a releasable capsule is used according to the present disclosure.

Particularly, the above-mentioned problem is solved by covering the inner surface of the casing material of a casing for a lithium metal secondary battery with a releasable capsule. Therefore, according to the present disclosure, when a penetrating member is inserted from the outside into the negative electrode active material layer and/or electrode assembly, in the case of a lithium metal secondary battery, it is possible to improve such low releasability of a lithium metal negative electrode to the inserted penetration member. As a result, it is possible to provide a lithium metal secondary battery with improved nail safety. In addition, it is possible to provide a lithium metal secondary battery prevented from a short-circuit.

As used herein, 'releasability' means how easily lithium metal can be discharged from a penetration member, when the penetration member is inserted from the outside into a negative electrode active material layer and/or electrode assembly.

Figure 1:
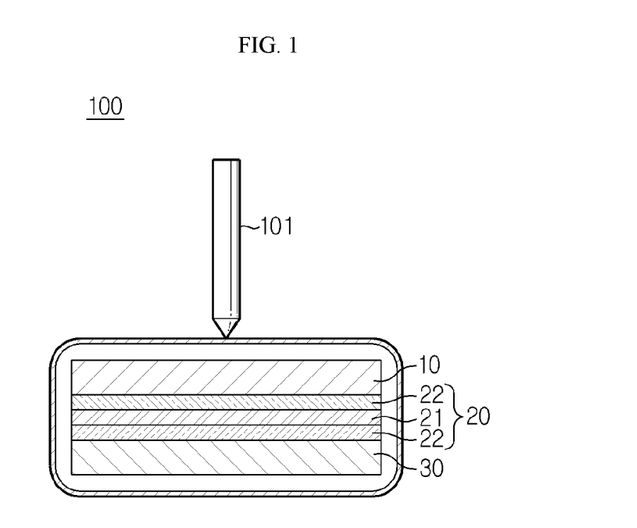
FIG. 1 is a schematic sectional view illustrating the lithium metal secondary battery according to Comparative Example.
Figure 2:
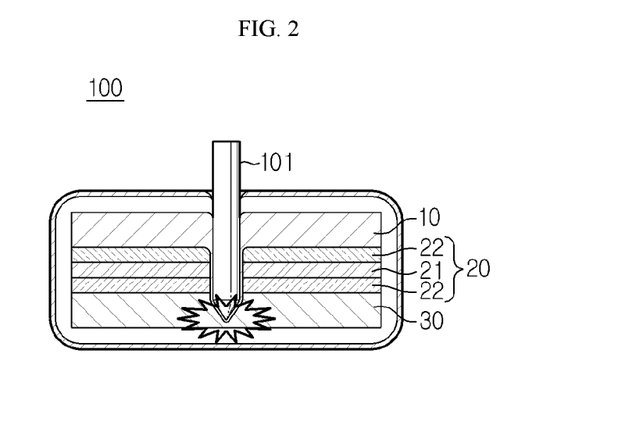
FIG. 2 is a schematic sectional view illustrating the lithium metal secondary battery according to Comparative Example, after subjecting it to a nail safety test.

For example, lithium metal is a metal having low releasability so that it may be attached to the surface of a penetration member with ease and may not be detached easily therefrom. Therefore, in the case of a lithium metal secondary battery using no releasable capsule, lithium metal is attached to the surface of the inserted penetration member and penetrates through the inner part of a negative electrode active material layer and/or electrode assembly together with the penetration member, thereby causing a short-circuit. This is shown in FIGS. 1 and 2 schematically. FIGS. 1 and 2 are schematic views illustrating a nail (penetration member) before and after it penetrates through the lithium metal secondary battery according to Comparative Example. As shown in FIGS. 1 and 2, lithium metal 10 having soft ductility is attached to the surface of the nail penetrating through the battery and moves together with the penetration member 101, when using no releasable capsule. Thus, lithium metal may be in direct contact with a positive electrode to cause a short-circuit.

On the other hand, the release agent according to the present disclosure is a material having high releasability to a penetration member and shows lower frictional force against the penetration member surface. Thus, in the lithium metal secondary battery including the releasable capsule according to the present disclosure, lithium metal can be detached easily from the surface of the inserted penetration member. In other words, releasability is improved. Therefore, according to the present disclosure, it is possible to prevent a short-circuit caused by the contact between lithium metal and a positive electrode and to provide a lithium metal secondary battery with improved safety.

To solve the above-mentioned technical problems, in an aspect of the present disclosure, there is provided a casing for a lithium metal secondary battery including: a battery casing material; at least one releasable capsule attached at least partially or totally to the inner surface of the casing material to cover the inner surface of the casing material; and a release solution supported in the releasable capsule.

According to an embodiment of the present disclosure, the casing for a lithium metal secondary battery includes a releasable capsule attached at least partially or totally to the inner surface of the battery casing material.

The releasable capsule may be a plurality of capsules.

In addition, the releasable coating film including the releasable capsule may form a layered structure.

According to an embodiment of the present disclosure, the releasable capsule includes a capsule coating film and a capsule inner space surrounded with the capsule coating film, the release solution is supported in the capsule inner space, and the release solution includes a release agent and a solvent.

Hereinafter, the present disclosure will be explained in detail with reference to FIGS. 3-5.

Figure 3:
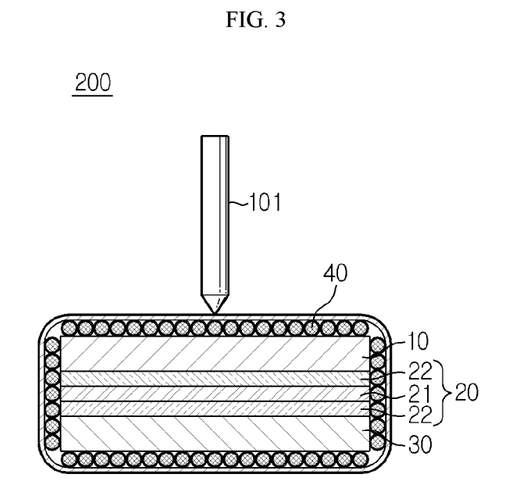
FIG. 3 is a schematic sectional view illustrating the lithium metal secondary battery according to an embodiment of the present disclosure.
Figure 4:
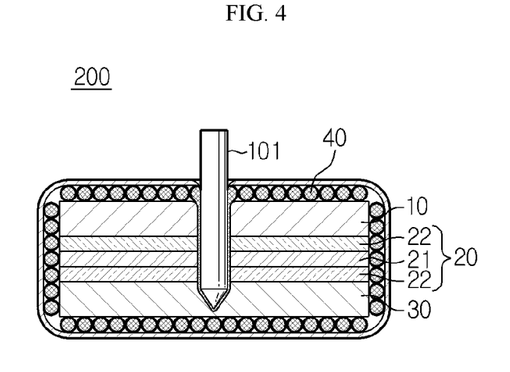
FIG. 4 is a schematic sectional view illustrating the lithium metal secondary battery according to an embodiment of the present disclosure, after subjecting it to a nail safety test.

FIGS. 3 and 4 are schematic views illustrating a lithium metal secondary battery including a releasable capsule 40, before and after a penetration member 101 penetrates through the battery. In the lithium metal secondary battery including a releasable capsule 40, the releasable capsule is ruptured while a nail penetrates through the battery. Then, the release solution discharged from the ruptured release capsule is attached to the penetration member 101. Thus, lithium metal having soft ductility is not attached to the penetration member 101 so that the lithium metal negative electrode may not be in direct contact with a positive electrode, thereby preventing a short-circuit.

Figure 5:
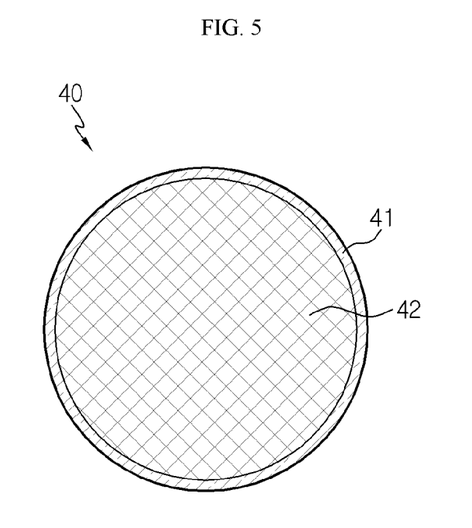
FIG. 5 is a schematic view illustrating the releasable capsule according to the present disclosure.

FIG. 5 is a schematic view illustrating the releasable capsule 40. More particularly, FIG. 5 illustrates a capsule coating film 41 and a release solution 42 supported in the inner space of the capsule surrounded with the capsule coating film 41.

According to the present disclosure, the releasable capsule prevents lithium metal from being attached to a penetration member, when the penetration member penetrates through the inner part of a negative electrode active material layer and/or electrode assembly. In other words, according to an embodiment of the present disclosure, the releasable capsule allows lithium metal to be released easily from the penetration member inserted from the outside, while preventing lithium metal from being attached easily to the penetration member. In other words, according to the present disclosure, the releasable capsule functions as a barrier between lithium metal and the penetration member, and thus prevents a short-circuit caused by the contact between lithium metal or a conductor and a positive electrode. In addition, the releasable capsule reduces friction between lithium metal and the penetration member. Therefore, lithium metal is prevented from being attached to the surface of the penetration member. In other words, the present disclosure is characterized in that the releasable capsule is used to increase releasability to the external material inserted to a lithium metal secondary battery. As a result, peel force or adhesion between lithium metal and the penetration member is decreased.

According to the present disclosure, use of the releasable capsule can prevent lithium metal from being inserted into a battery together with the penetration member inserted to the battery. Therefore, it is possible to prevent a short-circuit and to reduce a possibility of ignition.

According to the present disclosure, the releasable coating film is attached at least partially or totally to the inner surface of the battery casing material to cover the inner surface of the casing material.

According to an embodiment of the present disclosure, the releasable coating film may include at least one releasable capsule in which a release solution is supported.

According to the present disclosure, the releasable capsule is positioned on the inner surface of the battery casing material. In other words, the releasable capsule is not in direct contact with the electrode assembly including the lithium metal negative electrode so that it may not affect the battery performance.

According to an embodiment of the present disclosure, the releasable capsule includes a capsule coating film and a capsule inner space surrounded with the capsule coating film.

Particularly, the inner part of the capsule includes the release solution in the inner space surrounded with the capsule coating film. When the capsule coating film of the releasable capsule is ruptured by the penetration member inserted from the outside, the release agent supported in the inner part of the capsule is discharged.

According to an embodiment of the present disclosure, the releasable coating film may include at least one releasable capsule. The releasable capsule may be attached to the inside (inner surface) of the battery casing material.

According to an embodiment of the present disclosure, the releasable capsule may have a size of 0.1-100 μm.

According to an embodiment of the present disclosure, the releasable capsule may have any one shape selected from a foam type, supported type and a pouch type. The releasable capsule may be absorbed to or supported in a foam type, matrix type or pouch type. The matrix type may include a release solution supported in a porous support.

According to the present disclosure, the method for preparing a releasable capsule is not particularly limited, as long as it allows preparation of capsules in which a release agent is supported. According to an embodiment of the present disclosure, the capsule coating film may be prepared by dispersing a release agent to an organic solution through an emulsification process and carrying out polymerization on the oily surface thereof. Herein, the polymerization may be carried out by using an interfacial polymerization process, in-situ polymerization process, a coacervation process, or the like.

The capsule coating film is ruptured by the penetration member inserted from the outside. When the capsule coating film is ruptured, the release agent and solvent supported in the inner part of the capsule can be discharged.

According to an embodiment of the present disclosure, the capsule coating film may be ruptured under a pressure of 25 psi or more. The pressure may be determined by using a pressure-sensitive sheet (Fuji Image Tech. Co.).

Particular conditions under which the releasable coating film is ruptured may be controlled by the physical properties or molecular size of ingredients, and may be optionally adjusted by the preparation method.

According to an embodiment of the present disclosure, the capsule coating film may include a polymer resin as a capsule coating film ingredient.

According to an embodiment of the present disclosure, the polymer resin may include at least one of polyolefin, polyethylene terephthalate, polybutylene terephthalate, polyacetal, polyamide, polycarbonate, polyimide, polyetheretherketone, polyethersulfone, polyphenylene oxide, polyphenylene sulfide and polyethylene naphthalene, or a mixture of two or more of them.

According to an embodiment of the present disclosure, the capsule coating film may have a variable thickness depending on capsule coating film ingredients.

The releasable capsule includes a release solution supported in the inner space of the capsule.

The release solution includes a release agent and a solvent.

The release agent is discharged from the inner part of the capsule, when the penetration member penetrates through the inner part of the negative electrode active material layer and/or electrode assembly including the same and the capsule coating film is ruptured. The discharged release agent is attached to the surface of the penetration member to help lithium metal in the lithium metal negative electrode not to be attached to the penetration member.

According to an embodiment of the present disclosure, any release agent may be used, as long as it may be coated on the penetration member penetrating through the inner part of a negative electrode active material layer and/or electrode assembly including the same to prevent a short circuit, and it may delay the ignition temperature.

Particular examples of the release agent may include any one selected from the group consisting of a vinyl acetate resin, vinyl chloride resin, urethane resin, chlorinated rubber resin, phthalic acid resin, alkyd resin, epoxy resin, phenolic resin, melanin resin, acrylic resin, fluoro-resin which is a fluorinated compound, silicone resin, metal acrylate resin and a rosin resin, or a mixture of two or more of them.

According to an embodiment of the present disclosure, the release agent may include a vinyl acetate resin, vinyl chloride resin, urethane resin, chlorinated rubber resin, phthalic acid resin, alkyd resin, epoxy resin, phenolic resin, melanin resin, acrylic resin, fluoro-resin, silicone resin, metal acrylate resin, a rosin resin or a mixture of two or more of them.

Commercially available fluoro-resin release agent that may be used according to the present disclosure may include OPTOOL DSX or OPTOOL AES available from Daikin Co.; KY130 or KY108 available from Shinetsu Co.; Fluoro Surf FG-5020 available from Fluoro Technology Co.; Dow 2634 available from Dow Co., or the like. Particularly, as a fluoro-resin release agent, OPTOOL DSX having excellent releasability and surface lubrication property may be used. OPTOOL DSX includes a strong carbon (C)-fluorine (F) bond in its molecular structure and thus is stable. In addition, it shows excellent effects in terms of non-adhesive property, low frictional property, durability, or the like, since it shows no bindability with the other substance.

The fluoro-resin has high thermal stability, since the fluorinated compound itself has flame resistance, and thus can delay the ignition temperature more.

Any solvent may be used with no particular limitation, as long as the release agent may be dispersed or dissolved therein and it does not affect the performance of an electrode assembly.

According to an embodiment of the present disclosure, the solvent may be an organic solvent.

According to an embodiment of the present disclosure, the organic solvent may be 1-methyl-2-pyrrolidone, dimethyl acetamide, acetonitrile, dimethyl sulfoxide or a mixture of two or more of them.

According to an embodiment of the present disclosure, the solvent may be a fluorocarbon-based liquid.

The fluorocarbon-based liquid is a hydrocarbon compound at least one hydrogen atom of which is substituted with a fluorine atom. Non-limiting examples of the fluorocarbon-based liquid may include perfluoropentane, perfluorohexane, perfluoroheptane, perfluorooctane, perfluoromethylcyclohexane, perfluorotripropylamine, perfluorotributylamine, perfluorotriamylamine, perfluorotripentylamine, perfluorotrihexylamine, perfluoro-N-methylpyrrolidine, perfluoro-1,2-bis(trifluoromethyl)hexafluorocyclobutane, perfluoro-2-butyltetrahydrofuran, perfluorotrimethylamine, perfluorodibutylether or a mixture of two or more of them.

According to an embodiment of the present disclosure, the release agent may be used in an amount of 0.1-80 wt % based on the total weight of the release solution.

Within the above-defined range, the release agent may be used in an amount of 80 wt % or less, 55 wt % or less, or 50 wt % or less. For example, the release agent may be used in an amount of 0.1-55 wt %, 0.1-50 wt %, or 20-30 wt %, based on the total weight of the release solution.

Within the above-defined range of release agent content, the release agent does not have excessively high viscosity, and thus can be attached easily to a penetration member, thereby providing excellent effects of preventing a short-circuit and delaying ignition.

According to the present disclosure, 'penetration member' means a needle-like or rod-like object that can penetrate through the inner part of a negative electrode active material layer and/or electrode assembly.

According to an embodiment of the present disclosure, the penetration member may be a conductor or insulator.

According to an embodiment of the present disclosure, there is no particular limitation in shape or material of the penetration member. However, when the penetration member is a conductor, the conductive penetration member may be inserted to the inner part of a negative electrode active material layer and/or electrode assembly and may be in contact with both electrodes to allow electric current application, resulting in a short-circuit. In addition, when the penetration member is an insulator, lithium metal of the negative electrode in a lithium metal secondary battery may be attached to the surface of the inserted insulator, and then the insulating penetration member to which lithium metal is attached may cause electric current application between both electrodes.

The battery casing material may be selected suitably depending on the shape of an electrode assembly and use of a battery.

According to an embodiment of the present disclosure, when the casing material is a pouch type, an aluminum laminate pouch including an aluminum layer may be used. In addition, the opening portion of the aluminum laminate pouch may be sealed by hot welding or hot fusion, after injecting an electrolyte.

In another aspect of the present disclosure, there is provided a lithium metal secondary battery including the above-described casing for a lithium metal battery.

According to an embodiment of the present disclosure, the lithium metal secondary battery includes:
a battery casing; and
an electrode assembly received in the battery casing, wherein the electrode assembly includes a negative electrode, a positive electrode and a separator interposed between the negative electrode and the positive electrode, the negative electrode includes lithium metal as a negative electrode active material, and the battery casing is the above-described casing for a lithium metal secondary battery.

According to an embodiment of the present disclosure, the negative electrode may include a negative electrode current collector and a negative electrode active material layer formed on the surface of the negative electrode current collector.

According to an embodiment of the present disclosure, the negative electrode current collector is not particularly limited, as long as it causes no chemical change in the battery and has conductivity. Particular examples of the negative electrode current collector may include copper, stainless steel, aluminum, nickel, titanium, baked carbon, copper or stainless steel surface-treated with carbon, nickel, titanium or silver, aluminum-cadmium alloy, or the like. The negative electrode current collector may have various shapes, such as a film, sheet, foil, net, porous body, foam and a non-woven web body, and fine surface irregularities may be formed on the surface thereof or not.

According to an embodiment of the present disclosure, the negative electrode active material layer may include at least one of metal foil, metal alloy and metal powder.

According to an embodiment of the present disclosure, the negative electrode active material includes lithium metal, and may further include at least one selected from the group consisting of a lithium alloy, lithium metal composite oxide, lithiated titanium composite oxide (LTO), graphite, soft carbon, hard carbon and a combination thereof, or a mixture of two or more of them. Herein, the lithium alloy includes an element capable of forming alloy with lithium, and the element capable of forming alloy with lithium may include Si, Sn, C, Pt, Ir, Ni, Cu, Ti, Na, K, Rb, Cs, Fr, Be, Mg, Ca, Sr, Sb, Pb, In, Zn, Ba, Ra, Ge, Al or alloy thereof.

The negative electrode active material layer may have a thickness of 5-40 μm. According to an embodiment of the present disclosure, the lower limit of the negative electrode active material thickness may be 5 μm, 7 μm, 10 μm or more, and the upper limit of the negative electrode active material thickness may be 40 μm, 30 μm, 20 μm or less. Within the above-defined range, lithium ion can be diffused sufficiently into the negative electrode active material layer. In addition, within the above-defined range, the negative electrode active material layer may be supported by the negative electrode current collector and the problem of a decrease in energy density per volume of the negative electrode is insignificant.

According to an embodiment of the present disclosure, the negative electrode active material layer may be obtained by coating, binding, pressing or deposition of metal foil on a planar negative electrode current collector. Otherwise, the negative electrode active material layer may be obtained by applying metal powder onto a current collector. Meanwhile, the negative electrode active material layer may include metal foil or metal alloy alone without any current collector. According to an embodiment of the present disclosure, the negative electrode active material layer may be obtained by physical binding or pressing of lithium metal to a current collector. According to an embodiment of the present disclosure, the negative electrode active material layer may be obtained by electrodeposition or chemical vapor deposition of lithium metal on a current collector.

According to an embodiment of the present disclosure, the positive electrode is not particularly limited, and may be obtained by allowing a positive electrode active material to be bound to a positive electrode current collector by the method generally known in the art. Non-limiting examples of the positive electrode active material include conventional positive electrode active materials that may be used in a positive electrode of a conventional electrochemical device. Particularly, it is possible to use a lithium manganese oxide, lithium cobalt oxide, lithium nickel oxide, lithium iron oxide or a lithium composite oxide including a combination thereof.

The separator that may be used for the lithium metal secondary battery according to the present disclosure is not particularly limited, as long as it is an insulation film by which the negative electrode and the positive electrode are electrically insulated from each other. According to an embodiment of the present disclosure, the separator is interposed between the positive electrode and the negative electrode and may be a thin insulation film having high ion permeability and mechanical strength. In general, the separator may have a pore diameter of 0.01-10 μm and a thickness of 5-300 μm. Particular examples of the separator include sheets or non-woven webs made of olefinic polymers, such as polyethylene or polypropylene having chemical resistance and hydrophobicity, glass fibers or polyethylene, or the like.

According to an embodiment of the present disclosure, the separator may have a porous coating layer including inorganic particles bound to one another by an organic binder polymer, on at least one surface of the porous polymer substrate. The separator including such a porous coating layer may provide increased heat resistance.

According to an embodiment of the present disclosure, any porous polymer substrate may be used, as long as it is a planar porous polymer substrate used for an electrochemical device. For example, a thin insulation film having high ion permeability and mechanical strength, a pore diameter of 0.01-10 μm and a thickness of 5-300 μm may be used. For example, a porous polymer film made of a polyolefininc polymer, such as ethylene homopolymer, propylene homopolymer, ethylene/butene copolymer, ethylene/hexene copolymer or ethylene/methacrylate copolymer may be used alone or in the form of a laminate. In addition, conventional porous non-woven webs, such as those made of high-melting point glass fibers or polyethylene terephthalate fibers, may be used. However, the scope of the present disclosure is not limited thereto.

According to an embodiment of the present disclosure, there is no particular limitation in the inorganic particles, as long as they are electrochemically stable.

In other words, there is no particular limitation in the inorganic particles that may be used herein, as long as they cause no oxidation and/or reduction in the range (e.g. 0-5V based on Li/Li$^+$) of operating voltage of an applicable electrochemical device. Particularly, when using the inorganic particles having a high dielectric constant, it is possible to improve the ion conductivity of an electrolyte by increasing the dissociation degree of an electrolyte salt, such as a lithium salt, in a liquid electrolyte.

For the above-mentioned reasons, the inorganic particles may be inorganic particles having a dielectric constant of 5 or more, preferably 10 or more. Non-limiting examples of the inorganic particles having a dielectric constant of 5 or more may include $BaTiO_3$, $Pb(Zr,Ti)O_3$ (PZT), $Pb_{1-x}La_xZr_{1-y}Ti_yO_3$ (PLZT, wherein 0<x<1, 0<y<1), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ or a mixture thereof.

In addition, an inorganic particles having lithium ion transportability, i.e. inorganic particles which contains a lithium element and does not store lithium but transports lithium ions may be used. Non-limiting examples of the inorganic particles having lithium ion transportability may include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$-based glass (1<x<4, 0<y<13), such as $14Li_2O-9Al_2O_3-38TiO_2-39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), such as $Li_{3.25}Ge_{0.25}P_{0.75}S_4$, lithium nitride ($Li_xN_y$, 0<X<4, 0<y<2), such as $Li_3N$, $SiS_2$-based glass ($Li_xSi_yS_z$, 0<x<3, 0<y<2, 0<z<4), such as $Li_3PO_4$—$Li_2S$—$SiS_2$, $P_2S_5$-based glass ($Li_xP_yS_z$, 0<x<3, 0<y<3, 0<z<7), such as LiI—$Li_2S$—$P_2S_5$, or a mixture thereof.

In addition, there is no particular limitation in the average particle diameter of the inorganic particles. However, the inorganic particles preferably have an average particle diameter of 0.001-10 μm in order to form a coating layer with a uniform thickness and to provide suitable porosity. When the inorganic particles have an average particle diameter less than 0.001 μm, they may show low dispersibility. When the inorganic particles have an average particle diameter larger than 10 μm, the resultant coating layer may have an increased thickness.

As the binder polymer, a polymer used conventionally for forming a porous coating layer may be used. Particularly, a polymer having a glass transition temperature ($T_g$) of −200 to 200° C. may be used. This is because such a polymer can improve the mechanical properties, such as flexibility and elasticity, of the finally formed porous coating layer. Such a binder polymer functions as a binder which connects and stably fixes the inorganic particles with one another, and thus contributes to prevention of degradation of mechanical properties of a separator having a porous coating layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 MPa$^{1/2}$ or 15-25 MPa$^{1/2}$ and 30-45 MPa$^{1/2}$. Therefore, hydrophilic polymers having many polar groups may be used more frequently as compared to hydrophobic polymers, such as polyolefins. When the solubility parameter is less than 15 MPa$^{1/2}$ and more than 45 MPa$^{1/2}$, it is difficult for the binder polymer to be swelled with a conventional liquid electrolyte for a battery.

Non-limiting examples of the binder polymer include but are not limited to: polyvinylidene fluoride-co-hexafluoro-propylene, polyvinylidene fluoride-co-trichloro ethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose.

The weight ratio of the inorganic particles to the binder polymer may be preferably 50:50-99:1, and more preferably 70:30-95:5. When the weight ratio of the inorganic particles to the binder polymer is less than 50:50, the content of binder polymer is increased to cause a decrease in pore size and porosity of the resultant coating layer. When the content of inorganic particles is larger than 99 parts by weight, the content of binder polymer is excessively low to cause degradation of peeling resistance of the resultant coating layer.

The electrolyte that may be used in the lithium metal secondary battery according to the present disclosure is a salt having a structure of $A^+B^-$, wherein $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (g-butyrolactone) or a mixture thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

The lithium metal secondary battery according to an embodiment of the present disclosure may be obtained by the method as described hereinafter, but is not limited thereto.

First, a release solution containing a release agent dispersed in a solvent is prepared (S1).

The release agent is the same as described above.

The solvent may be a fluorocarbon-based liquid.

The fluorocarbon-based liquid that may be used for the release solution is a hydrocarbon compound at least one hydrogen atom of which is substituted with a fluorine atom. Particular examples of the fluorocarbon-based liquid may include, but are not limited to: any one selected from perfluropentane, perfluorohexane, perfluoroheptane, perfluorooctane, perfluoromethylcyclohexane, perfluorotripropylamine, perfluorotributylamine, perfluorotriamylamine, perfluorotripentylamine, perfluorotrihexylamine, perfluoro-N-methyl-morpholine, perfluoro-N-ethylmorpholine, perfluoro-N-isoproylmorpholine, perfluoro-N-methylpyrrolidine, perfluoro-1,2-bis(trifluoromethyl)hexafluorocyclobutane, perfluoro-2-butyltetrahydrofuran, perfluorotrimethylamine and perfluorodibutylether, or a mixture of two or more of them.

Commercially available fluorocarbon-based liquid that may be used according to the present disclosure may include, but are not limited to: Fluorinert™ FC-40, Fluorinert™ FC-43 Fluid, Fluorinert™ FC-71 Fluid, Fluorinert™ FC-72 Fluid, Fluorinert™ FC-77 Fluid, Fluorinert™ FC-84 Fluid, Fluorinert™ FC-87 Fluid, Fluorinert™ FC-3283 Fluid, Fluorinert™ FC-8270, Performance Fluid™ PF-5060, Performance Fluid™ PF-5070, Performance Fluid™ PF-5052, or the like, available from 3M Co. According to an embodiment of the present disclosure, when OPTOOL DSX is used as a fluorinated release agent and a perfluorinated compound, Fluorinert™ FC-3283 Fluid, is used as a fluorocarbon-based liquid, it is possible to provide high thermal stability and chemical stability and to form a desired self-assembled monolayer without deterioration. Thus, it is possible to ensure an anti-fouling effect, low friction and non-adhesive property.

Next, a releasable capsule in which the release solution is supported is prepared (S2).

According to an embodiment of the present disclosure, the release agent may be dispersed onto an organic solution through an emulsification process and polymerization may be carried out on the oily surface thereto to obtain a capsule coating film. Herein, the polymerization may be carried out by using interfacial polymerization, in-situ polymerization, coacervation process, or the like.

However, there is no particular limitation in the polymerization method, as long as it allows preparation of a capsule in which a release agent is supported, in the same manner as described herein.

Then, at least one releasable capsule is attached at least partially or totally to the inner surface of the battery casing material to obtain a battery casing in which the inner surface of the battery casing material is coated with the releasable capsule (S3).

Particularly, the releasable capsule in which the release solution is supported is dispersed in a dispersion medium to obtain a dispersion. The dispersion may further include a binder polymer. In addition, the dispersion may further include a dispersing agent as an additive. The dispersion is applied to the inner surface of the battery casing material. In a variant, the binder polymer is applied to the inner surface of the casing material, and then the releasable capsule may be sprayed thereto. However, the scope of the present disclosure is not limited thereto.

In addition, in order to fix the releasable capsule more firmly, compression may be carried out within a predetermined pressure range.

After that, an electrode assembly including lithium metal as a negative electrode active material is introduced to the battery casing (S4).

According to an embodiment of the present disclosure, the negative electrode introduced to the battery casing may be obtained by the following method.

First, a negative electrode current collector is prepared and lithium metal is formed on the surface of the negative electrode current collector. As described above, any conventional method used in the art, such as pressing, application, deposition or electrodeposition, may be used to form lithium metal.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1-1: Preparation of Releasable Capsule and Battery Casing Material

Preparation of Releasable Capsule

First, OPTOOL DSX (Daikin) (a type of fluorinated resin) as a release agent was added to Fluorinert™ FC-3283 (3M) (a fluorocarbon-based liquid) as a solvent to obtain a release solution. The content of release agent was 0.5 wt % based on the total weight of the release solution.

The release solution was supported in a capsule coating film made of a polymer resin (high-density polyethylene, HDPE) to obtain a releasable capsule. Herein, the content of the supported release solution was 10 μL.

Particularly, to obtain the releasable capsule, the capsule coating film was prepared by dispersing OPTOOL DSX (Daikin) as a release agent in Fluorinert™ FC-3283 (3M) (a fluorocarbon-based liquid) as an organic solution through an emulsification process, and then carrying out polymerization of HDPE on the oily surface thereof Manufacture of Casing for Lithium Metal Secondary Battery Polyvinylidene fluoride was applied to the inner surface of a pouch-type battery casing material to form a polyvinylidene fluoride layer. Then, the releasable capsule obtained as described above was sprayed thereto and compression was carried out under a pressure of 10 psi by using a pressurization device so that the releasable capsule might be attached to the inner surface of the battery casing material.

Examples 2-1 to 7-1

Casings for a lithium metal secondary battery were obtained in the same manner as Example 1, except that the type and content of release agent in the release solution of Example 1-1 were changed as shown in the following Table 1.

TABLE 1

| | Ex. 1-1 | Ex. 2-1 | Ex. 3-1 | Ex. 4-1 | Ex. 5-1 | Ex. 6-1 | Ex. 7-1 |
|---|---|---|---|---|---|---|---|
| Type of release agent | Fluoro silane | Fluoro silane | Fluoro silane | Perfluoro polyether | Fluoroacrylate | Perfluoro-methacrylate | Silicone resin |
| Content of release agent | 0.5 wt % | 25 wt % | 50 wt % | 25 wt % | 25 wt % | 25 wt % | 25 wt % |

Examples 1-2 to 7-2: Manufacture of Battery Cell

Manufacture of Positive Electrode

First, 96 g of $LiCoO_2$, 2 g of PVDF and 2 g of carbon black were added to 100 mL of N-methyl pyrrolidone, followed by mixing, to prepare positive electrode slurry. Next, the resultant positive electrode slurry was applied to aluminum foil having a thickness of 15 μm as a positive electrode current collector to a capacity of 3 $mAh/cm^2$. Then, drying was carried out at 130° C. for 2 hours to obtain a positive electrode.

Manufacture of Lithium Metal Negative Electrode

Lithium metal foil having a thickness of 20 μm was stacked on copper foil having a thickness of 20 μm as a negative electrode current collector at 100° C. under 0.5 Mpa to obtain a lithium metal negative electrode including lithium metal coated on the surface of the current collector.

Manufacture of Battery Cell

A separator (made of polyethylene, thickness 20 μm) was interposed between the negative electrode and the positive electrode to obtain a coin-cell type electrode assembly.

The electrode assembly was introduced to each of the casings for a lithium metal secondary battery according to Examples 1-1 to 7-1, and an electrolyte was injected thereto. Then, the battery casing was sealed to obtain a battery cell.

The electrolyte was prepared by adding 1M $LiPF_6$ to an organic solvent including ethylene carbonate (EC) and ethyl methyl carbonate (EMC) at a volume ratio of 30:70.

Comparative Example 1

A battery casing was obtained in the same manner as Example 2-1, except that the releasable capsule was not used.

A battery cell was obtained in the same manner as Example 2-2 by using the battery casing.

Comparative Example 2

A battery cell was obtained in the same manner as Example 2-2, except that the releasable capsule according to Example 2-1 was not used and the negative electrode was obtained by the following method.

Manufacture of Negative Electrode

Artificial graphite, carbon black, carboxymethyl cellulose (CMC) and a binder (BM-L301 available from Zeon Company) were mixed with water at a weight ratio of 95.8:1:1.2:2 to obtain negative electrode slurry. The resultant negative electrode slurry was coated on copper (Cu) foil to a thickness of 50 μm to form a thin electrode plate. Then, the electrode plate was dried at 135° C. for 3 hours or more and then pressed to obtain a negative electrode.

Comparative Example 3

A battery cell was obtained in the same manner as Example 2-2, except that the releasable capsule according to Example 2-1 was used but attached to the electrode assembly itself, not the battery casing material.

Test Example 1

Each of the battery cells according to Examples 1-2 to 7-2 and Comparative Examples 1 to 3 was used to evaluate the performance thereof in the manner as described hereinafter.

(1) Determination of Capacity Retention

Each of the lithium metal batteries according to Examples and Comparative Examples was charged at room temperature to 4.25V at 0.3 C in a constant current-constant voltage (CC-CV) mode and discharged to 3V at 0.5 C in a constant current mode. The charge/discharge cycles were repeated to 200 times to determine capacity retention. The results are shown in the following Tables 2 and 3.

(2) Determination of Nail Safety

Each of the batteries according to Examples and Comparative Examples was fully charged under a voltage of 4.2V, and a nail having a diameter of 2.5 mm was allowed to penetrate through the center of each battery. Then, it was determined whether ignition occurred or not in each battery. The results are shown in the following Tables 2 and 3.

(3) Determination of Ignition Temperature

Each of the batteries according to Examples and Comparative Examples was stored in a hot box oven at 130° C. (heating from room temperature at a rate of 5° C./min.) for 1 hour and the ignition temperature in each battery was determined.

TABLE 2

| | Ex. 1-2 | Ex. 2-2 | Ex. 3-2 | Ex. 4-2 | Ex. 5-2 | Ex. 6-2 | Ex. 7-2 |
|---|---|---|---|---|---|---|---|
| Capacity retention (@200$^{th}$ cycle) | 80% | 82% | 79% | 81% | 82% | 81% | 80% |
| Short-circuit (Nail TEST) | X | X | ▲ (short-circuit occurred in some cases) | X | X | X | X |
| Ignition temperature (Hotbox TEST) | 195 | 225 | 198 | 222 | 220 | 215 | 200 |

TABLE 3

| | Ex. 2-2 | Comp. Ex. 1 | Comp. Ex. 2 | Comp. Ex. 3 |
|---|---|---|---|---|
| Capacity retention (@200$^{th}$ cycle) | 82% | 80% | 90% | 50% |
| Short-circuit (Nail TEST) | X | ○ | ○ | X |
| Ignition temperature (Hotbox TEST) | 225 | 170 | 180 | 220 |

Comparative Examples 1 relates to the same lithium metal battery as Example 2-1, except that it uses no releasable capsule. Since Comparative Example 1 includes no releasable capsule, lithium metal having high ductility is attached to the nail surface and is in direct contact with the positive electrode. Thus, it can be observed that a short-circuit occurs in the battery according to Comparative Example 1.

On the contrary, in the case of Examples 1 to 3, the releasable capsule is positioned on the inner surface of the battery casing material. Thus, it can be observed that a short-circuit is prevented in each battery. In the case of Examples 4 to 7, it can be observed that a short-circuit is prevented not only by the fluorinated release agent but also silicone resin, and the ignition temperature is delayed.

Comparative Example 2 relates to a lithium ion battery using no releasable capsule.

In the case of Comparative Example 3, the releasable capsule is not attached to the casing material but to the electrode assembly itself. It can be seen from Comparative Example 3 that attachment of the releasable capsule to the inner surface of the casing material, not the electrode assembly itself, does not affect the battery performance.

DESCRIPTION OF DRAWING NUMERALS 100, 200: Electrode assembly
10: Lithium metal negative electrode
20: Separator
21: Porous polymer substrate
22: Organic/inorganic porous coating layer
30: Positive electrode
40: Releasable capsule
41: Capsule coating film
42: Release solution
101: Penetration member

What is claimed is:

1. A casing for a lithium metal secondary battery comprising:
a battery casing material;
at least one releasable support attached at least partially or totally to an inner surface of the casing material to cover the inner surface of the casing material; and
a release solution contained in the releasable support,
wherein the releasable support comprises a support coating film and a support inner space surrounded by the support coating film,
the release solution is contained in the support inner space,
the release solution comprises a release agent and a solvent, and
the release agent comprises one selected from the group consisting of a vinyl acetate resin, vinyl chloride resin, chlorinated rubber resin, phthalic acid resin, alkyd resin, epoxy resin, phenolic resin, melanin resin, acrylic resin, fluoro-resin, silicone resin, metal acrylate resin, a rosin resin, and a mixture of two or more thereof.

2. The casing for a lithium metal secondary battery according to claim 1, wherein the release agent comprises the fluoro-resin, where the fluoro-resin comprises one selected from the group consisting of fluorosilane, perfluoropolyether, fluoroacrylate, perfluoromethacrylate, and a mixture of two or more thereof.

3. The casing for a lithium metal secondary battery according to claim 1, wherein the releasable support comprises a polymer resin as a support coating film ingredient, and the support coating film is ruptured by a penetration member inserted from an outside of the casing so that the release solution contained in the support inner space is discharged.

4. The casing for a lithium metal secondary battery according to claim 3, wherein the polymer resin comprises one selected from the group consisting of polyolefin, polyethylene terephthalate, polybutylene terephthalate, polyacetal, polyamide, polycarbonate, polyimide, polyetheretherketone, polyethersulfone, polyphenylene oxide, polyphenylene sulfide, polyethylene naphthalene, and a mixture of two or more thereof.

5. The casing for a lithium metal secondary battery according to claim 1, wherein the release agent is present in an amount of 0.1-80 wt % based on a total weight of the release solution.

6. The casing for a lithium metal secondary battery according to claim 1, wherein the releasable support has a shape selected from the group consisting of a foam, a matrix and a pouch.

7. A lithium metal secondary battery comprising:
a battery casing according to claim 1; and
an electrode assembly contained in the battery casing,
wherein the electrode assembly comprises a negative electrode, a positive electrode and a separator interposed between the negative electrode and the positive electrode, and
the negative electrode includes lithium metal as a negative electrode active material.

8. A method for manufacturing the lithium metal secondary battery according to claim 1, comprising:
preparing a release solution including a release agent dispersed in a solvent;
preparing a releasable support in which the release solution is contained;
attaching at least one releasable support at least partially or totally to an inner surface of a battery casing material to provide a battery casing in which the inner surface of the battery casing material is covered with the releasable support; and
introducing an electrode assembly including lithium metal as a negative electrode active material to the battery casing.

9. The method for manufacturing a lithium metal secondary battery according to claim 8, wherein the release agent comprises one selected from the group consisting of a vinyl acetate resin, a vinyl chloride resin, a urethane resin, a chlorinated rubber resin, a phthalic acid resin, an alkyd resin, an epoxy resin, a phenolic resin, a melanin resin, an acrylic resin, a fluoro-resin, a silicone resin, a metal acrylate resin, a rosin resin, and a mixture of two or more thereof.

10. The method for manufacturing a lithium metal secondary battery according to claim 9, wherein the release agent comprises the fluoro-resin, where the fluoro-resin comprises one selected from the group consisting of fluorosilane, perfluoropolyether, fluoroacrylate, perfluoromethacrylate, and a mixture of two or more thereof.

11. The method for manufacturing a lithium metal secondary battery according to claim 8, wherein the solvent comprises one selected from the group consisting of perfluoropentane, perfluorohexane, perfluoroheptane, perfluorooctane, perfluoromethylcyclohexane, perfluorotripropylamine, perfluorotributylamine, perfluorotriamylamine, perfluorotripentylamine, perfluorotrihexylamine, perfluoro-N-methyl-morpholine, perfluoro-N-ethylmorpholine, perfluoro-N-isoproylmorpholine, perfluoro-N-methylpyrrolidine, perfluoro-1,2-bis(trifluoromethyl) hexafluorocyclobutane, perfluoro-2-butyltetrahydrofuran, perfluorotrimethylamine, perfluorodibutylether, and a mixture of two or more thereof.

12. The method for manufacturing a lithium metal secondary battery according to claim 8, wherein the release agent is present in an amount of 0.1-80 wt % based on a total weight of the release solution.

13. The casing for a lithium metal secondary battery according to claim 1, wherein the release agent is present in an amount of 0.1 to 50 wt % based on a total weight of the release solution.

14. The casing for a lithium metal secondary battery according to claim 1, wherein the release agent is present in an amount of 20 to 30 wt % based on a total weight of the release solution.

15. The casing for a lithium metal secondary battery according to claim 1, wherein the release agent comprises fluorosilane.

16. The casing for a lithium metal secondary battery according to claim 1, wherein the release agent comprises perfluoropolyether.

17. The casing for a lithium metal secondary battery according to claim 1, wherein the release agent comprises fluoroacrylate.

18. The casing for a lithium metal secondary battery according to claim 1, wherein the release agent comprises perfluoromethacrylate.

* * * * *